Nov. 29, 1955  H. BERGERHOFF  2,725,005
FOCAL PLANE SHUTTER
Filed Oct. 26, 1954  2 Sheets-Sheet 1
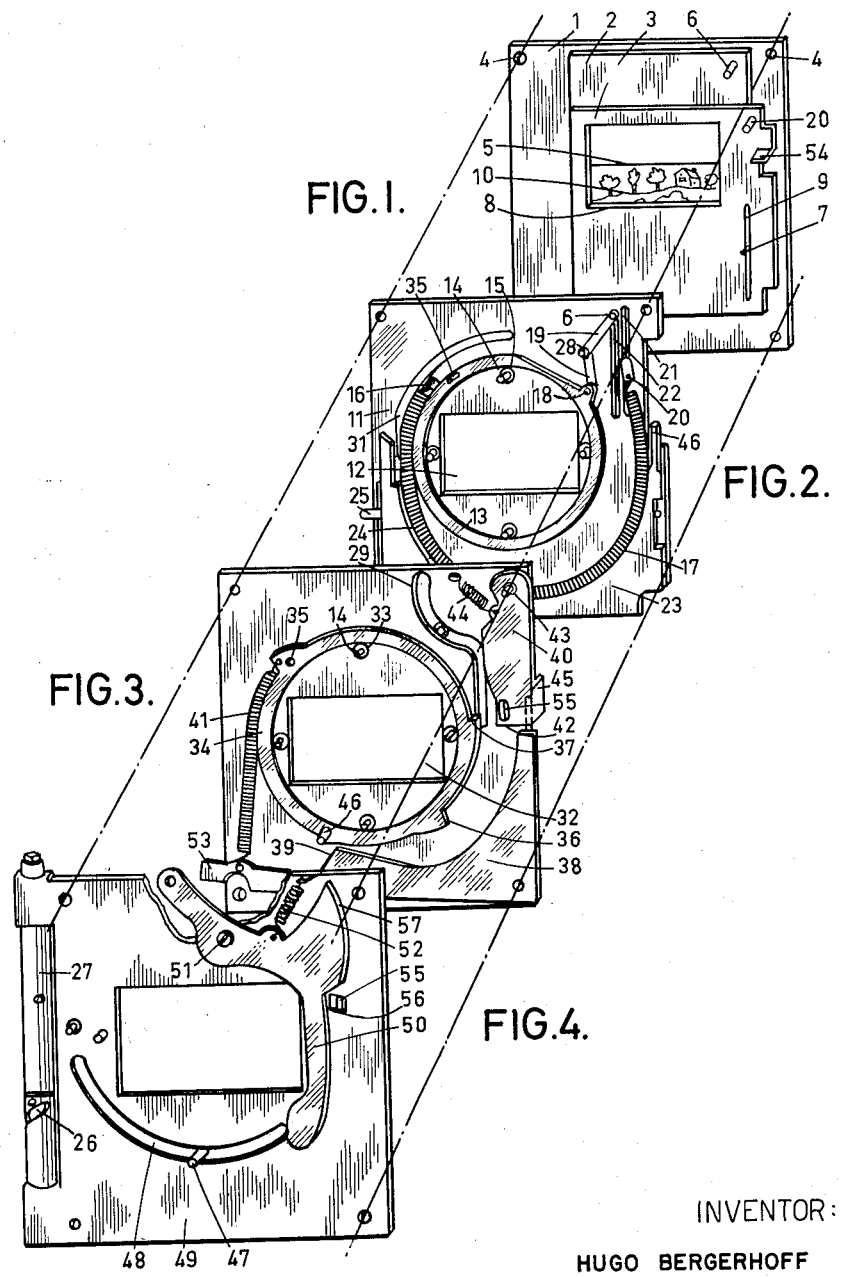
INVENTOR:
HUGO BERGERHOFF
BY Toulmin & Toulmin
ATTORNEYS

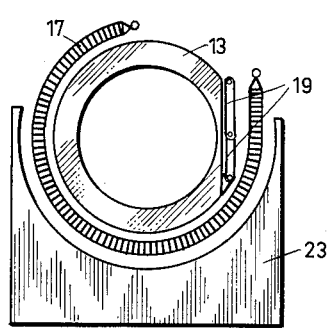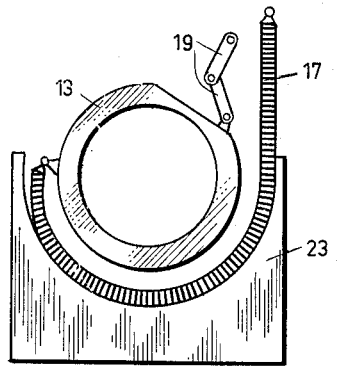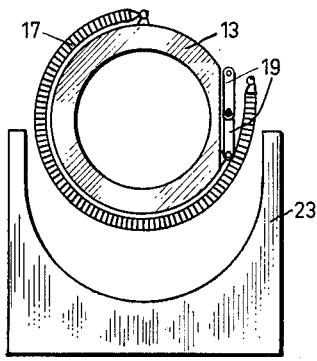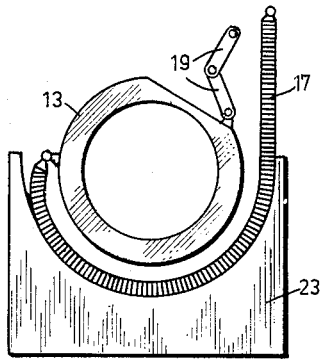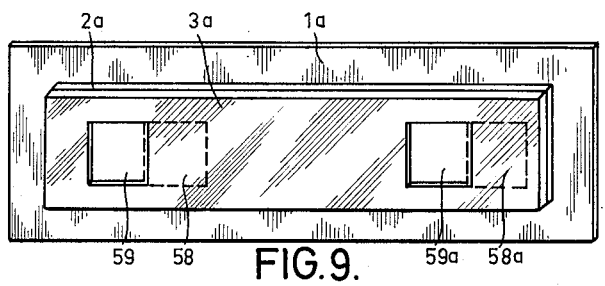

United States Patent Office 2,725,005
Patented Nov. 29, 1955

2,725,005

FOCAL PLANE SHUTTER

Hugo Bergerhoff, Oberreifenberg in Taunus, Germany

Application October 26, 1954, Serial No. 464,753

Claims priority, application Germany October 30, 1953

11 Claims. (Cl. 95—55)

The invention relates to a focal plane shutter which is adapted to be used for cameras having a single objective and for stereoscopic cameras and which operates with shutter members which may be tensioned when covered, start at different times and form an infinitely variable slot.

The known focal plane shutters are comparatively complicated and consist of a large number of separate parts, whereby the manufacture and assembly of the shutter take considerable time and are expensive. Furthermore, such shutters are very sensitive because of their complicated form. In addition, with focal plane shutters in which the shutter members consist of rigid shutter plates, it has hitherto been necessary, almost with exception, to choose a shutter dimension which is at least five times the width of the picture. Consequently, the designer of the camera housing was tied to the large dimensions of the focal plane shutter.

One main object of the invention is to provide a focal plane shutter which operates with rigid shutter plates and with which the total width dimension at the most amounts to about three times that of the picture width.

It is a further object to provide a shutter of very simple construction which only requires a minimum number of separate parts as compared with the former constructions, and the manufacture and assembly of which is very quick and can be carried out without special expenditure for equipment.

These and other objects and advantages which are to to seen from the description of the drawings are obtained by the fact that the two shutter members are at any time coupled by an impact element to a common driving member, the following shutter member being driven by an impact element which may be designated either as a push rod or as a flexible push-and-pull element, such as a helical spring, chain, plastic rod or the like. With the tripping of the leading shutter member, the said impact element of the following shutter member is already idly driven until it reaches an adjustable stop, by which it is possible to determine the instant of tripping the following shutter member and thus the width of the slot. The said novel impact element therefore has, in other words, an adjustable yielding capacity, the setting of which corresponds to the slot width to be chosen and to the selected instant of tripping the following shutter member. Instead of the said impact element, it is also possible to use a tension element which produces the same action, but merely in the reverse direction.

One constructional example, to which the invention is not restricted, is shown in the drawing, wherein:

Figures 1 to 4 represent a complete view of the focal plane shutter, which has been exploded to provide four separate perspective views for the purpose of easier illustration. In the assembled position, the four parts are disposed tightly one upon the other and form an operational focal plane shutter;

Figures 5 and 6 are two fragmentary views of the shutter when set for the smallest slot width, these figures showing the tensioned and tripped positions, respectively;

Figures 7 and 8 are two fragmentary views of the shutter when set for the maximum slot width, these figures showing the tensioned and tripped positioned, respectively;

Figure 9 is a diagrammatic view of the two shutter members, which are fashioned in the manner of the example shown in Figure 1 and are intended for use on stereoscopic cameras.

The base plate 1 containing an image aperture carries the two shutter curtains 2 and 3 which are fashioned as rigid plates and are guided relatively to the said base plate and to one another. The base plate 1 is also formed at the four corners with holes 4 for receiving bolts or studs for the purpose of connecting the other plates which are hereinafter to be described. The lower shutter curtain 2 with the image aperture 5 is guided on the base plate 1 and is provided with two guide pins 6 and 7 for guiding the other superimposed curtain 3 with the image aperture 8. The pin of the lower curtain engages in a slot 9 of the curtain 3. The exposure slot 10 is formed by the upper edge of the aperture 5 of the curtain 2 and by the lower edge of the aperture 8 of the curtain 3. The view in Figure 1 shows the position of the curtains, in which the exposure slot 10 is just moving over the image aperture of the plate 1 and is approaching the upper end position.

The plate 11 according to Figure 2 is pushed on to the arrangement which has been described by using the bolt connection above referred to. This plate 11 is formed in its central zone with an image aperture 12 and has pins 14 with freely rotatable rollers 15 arranged concentrically of the optical axis for the mounting of the rotatable actuating ring 13. The positions of the parts which can be seen in Figure 2 correspond to those of Figure 1, that is to say, the exposure slot 10 formed by the curtain edges is just short of completing its path of travel. The actuating ring 13 is engaged at the point 16 by the flexible impact element, which consists, for example, of a helical spring 17, while a further impact element, for example, a toggle lever 19, engages at the point 18. The helical spring 17 is anchored at its free end to the following curtain 3 according to Figure 1 by means of a pin 20 which extends through the slot 21 of the plate 11, while the free end of the toggle lever 19 is connected to the leading curtain 2 by using the aforementioned pin 6, which passes through the slot 22 of the plate 11. The stop for the helical spring 17 for setting the width of the exposure slot consists of the slide 23, which is formed with a substantially semi-circular recess 24 into which the helical spring 17 is fitted in the stop positoin. The actuation of the slide may be effected by the stud 25 which engages in the helical groove 26 of the rotatably mounted shaft 27 (Figure 4). On the other hand, however, the possibility exists of the slide being actuated directly by a handle member.

Since the toggle lever 19 of the leading curtain must deflect outwards from a certain instant, as hereinafter to be more fully explained, the stud 28 in the toggle joint is guided in a slot 29 of the plate 30 (Figure 3). 31 represents the guide bar for the helical spring 17, which bar may at the same time serve as a limiting stop for the slide 23.

The plate 30 already referred to and shown in Figure 3 is positioned on the arrangement according to Figure 2 by using the above-described bolt connection, the said plate likewise being formed with an image aperture 32. The parts which are mounted on the plate 30 are also shown in a position which corresponds to those of the parts according to Figures 1 and 2, that is to say, the exposure slot 10 is just about to reach its end position.

The parts arranged on the plate 30 form the setting and release means for the shutter. The setting ring 34 disposed concentrically of the optical axis is mounted to rotate on the studs 14 provided with rollers 33 and engaged by means of a hole over the pin 35 which is fixed to the actuating ring 13 according to Figure 2 and which extends through a slot in the plate 30. Provided on the setting ring are two projections 36 and 37, of which the projection 36 co-operates with a release lever 38 constructed as a bellcrank lever, the co-operation being produced by a cam 39 arranged on the lever arm extending laterally. The other arm engages under the "bulb" latch 40. The release lever 38 is under the action of a spring 41, the other end of which is anchored to the setting ring 34.

The other projection 37 of the setting ring co-operates with the edge 42 of the "bulb" latch 40. The "bulb" latch 40 is mounted at one end on the pivot 43 and is loaded by the spring 44, so that it has a tendency to pivot towards the left. It is prevented from carrying out this pivotal movement by the bent-over lug 45, which rests on one of the arms of the release lever 38. If this release lever is urged downwardly, the lug still bears on the end 46 of the slide 23 (Figure 2), and it is only when the latter has assumed its end position which is shown in the drawing and which corresponds to the "bulb" exposure that the lug 45 and thus the "bulb" latch 40 is able to carry out a slight rocking movement towards the left, so that the edge 42 moves into the range of the projection 37 of the setting ring.

The setting ring also carries a stud 47 which engages through the slot 48 of the plate 49 (Figure 4) and in this position co-operates with the setting lever 50. The setting lever is pivotally mounted at the point 51 and is loaded by the spring 52.

The operation of the focal plane shutter which has been described is as follows: The adjustment of the selected slot width may be carried out independently of the setting operation of the shutter. For the adjustment, the slide 23 (Figure 2) is brought into the suitable position. For setting the shutter, the setting lever 50 is turned in a clockwise direction, whereby the pin 47 and thus the setting ring 34 is driven, and at the same time the driving ring 13 is rotated by the pin 35, whereby the curtains 2 and 3 are brought into their upper end position, shown in the drawing, by means of the helical spring 17 and the toggle lever 19. The set position is ensured by the engagement of the projection 36 behind the cam 39 of the release lever 38. It is to be assumed that the slide 23 has reached the position according to Figure 2.

If now the release lever 38 is rocked in a counter-clockwise direction by applying pressure to the free end 53, it releases the projection 39, so that the setting ring 34 is rotated in a counter-clockwise direction by the action of the spring 41, driving with it the actuating ring 13. By the rotation of the ring 13, the leading curtain 2 is initially moved by means of the toggle lever 19, while the helical spring 17, without any action on the following curtain 3, initially yields to such an extent that it has been completely introduced into the recess 24 of the slide 23. At this instant, it is possible for the helical spring 17 to exert a pushing force, produced by the rotation of the ring 13, on the following curtain 3, so that as the ring 13 continues to rotate, the two curtains 2 and 3 are now displaced jointly while maintaining their spacing until the exposure slot 10 has travelled in front of the exposure apertures of the plates. At this moment, the leading curtain 2 has already reached its end position, while the following curtain must continue to move for the width of the slot in order to close the shutter and thus to effect the setting in the covered position, which is also effected by continued rotation of the ring 13. For this purpose, however, the toggle lever 19 must yield or bend, which is effected by the guiding of the pin 28 in the slot 29 of the plate 30. The two end positions of the operation described are illustrated in Figures 5 and 6. The tensioned or set position is shown in Figure 5, the slide 23 having assumed a position which corresponds substantially to the smallest slot width. In the end position, in which the two curtains 2 and 3 substantially coincide, the toggle lever 19 is bent (Figure 6) in order to permit the continued travel of the following curtains as far as its end position.

Two further end positions of the shutter are shown in Figures 7 and 8, in which the setting corresponds substantially to the maximum slot width or to that for a "bulb" exposure. In the set position (Figure 7), it is possible to see the large space which is exposed by the slide 23 and which has to be bridged over by the initially idly travelling helical spring 17 with rotation of the ring 13 until the full bearing position which is to be seen in Figure 8. In this view illustrating the tripped position, it is possible at the same time to see the bending of the toggle lever 19 of the leading curtain.

For the "bulb" exposure, the slide 23 is brought into its bottom end position seen in the drawing, so that the end 46 of the slide 23 is outside the range of movement of the lug 45. With the release of the shutter, the setting ring 34 is retained in an intermediate position by the bulb latch 40 rocked in a clockwise direction by the cam 37 which strikes against the edge 42, this intermediate position corresponding to the position in which the leading curtain has just uncovered the full image aperture and the helical spring 17 has still not completely reached the position in which it is supported at the recess 24 of the slide 23, so that the following curtain 3 is still disposed in its lower end position. If now the pressure on the release lever 38 is relieved, the bulb latch is again moved towards the right and the setting ring 34 is able to complete its pivotal movement, that is to say, the ring 13 continues to rotate and, by means of the helical spring 17 which has meantime taken up its position, moves the following curtain 3 past the exposure aperture for the purpose of closing the latter.

In order to prevent a premature forward movement of the following curtain due to forces of acceleration when making a bulb exposure, this curtain 3 is provided with a projection 54 which, when the bulb latch 40 is swung inwardly, abuts against the lug 45 thereof and is only released when the latch is swung back again.

On the other hand, the case may also occur that, when the shutter is set for a "bulb" exposure, the release lever 38 is simultaneously actuated during the setting operation, that is to say, during the downward displacement of the curtains 2 and 3, so that consequently the lug 45 moves into the path of the projection 54 and the latter may snap off with a continued powerful setting movement. In order to prevent this, the bulb latch 40 is provided with a projection 55 which is guided in a slot 56 in the plate 49 and, in the setting movement, that is to say, when the setting lever 50 is rocked in a clockwise direction, is held in the outermost position by the cam 57 thereof, so that an undesirable dropping of the bulb latch is impossible during the setting.

The novel focal plane shutter is particularly suitable also for stereoscopic cameras, since in this case the additional expenditure is extremely small, since it is possible, for example, for the shutter mechanism described with reference to Figures 1 to 8 to be used without modification and without duplication. As shown in Figure 9, it is merely necessary for the two curtains 2a and 3a to be lengthened and provided with two image apertures 6a and 6b, and 10a and 10b, respectively, which are spaced apart by the interocular distance and which co-operate with corresponding image apertures in the base plate 1a.

The invention is not limited to the constructional examples which have been described and illustrated, but it embraces all forms of focal plane shutters in which at least the following curtain is actuated by an impact element which initially moves idly with the commencement of the travel of the leading curtain for forming the slot width, and which has a yielding capacity limited by an adjustable stop which determines the slot width and the instant at which the following curtain starts to move.

I claim:

1. A focal plane shutter for cameras with a single objective and for stereoscopic cameras, comprising a leading shutter curtain, a following shutter curtain, a common driving member for said curtains, impact elements coupling the shutter curtains to said driving member, and an adjustable stop with which at least the impact element of the following shutter curtain cooperates in an adjustable yielding manner whereby the time for tripping the following shutter curtain may be determined.

2. A focal plane shutter as claimed in claim 1, wherein the impact element of the following shutter curtain is formed by a flexible push-and-pull element.

3. A focal plane shutter as claimed in claim 1, wherein the impact element of the leading shutter curtain is formed by a toggle lever.

4. A focal plane shutter as claimed in claim 1, wherein the adjustable stop comprises a substantially semi-circular recess in which the impact member of the following shutter curtain is arcuately guided.

5. A focal plane shutter as claimed in claim 1, wherein the impact element of the leading shutter curtain is formed by a toggle lever provided with a pin in the region of the toggle hinge, said pin travelling in a slotted guideway in a support for the common driving member.

6. A focal plane shutter as claimed in claim 1, wherein the common driving member is of annular form and is rotatably mounted on a supporting plate, the axis of rotation being approximately coincident with the optical axis of the shutter.

7. A focal plane shutter as claimed in claim 1, comprising roller pins on which the common driving member is mounted, a setting ring concentrically arranged with respect to said driving member and also mounted on the said pins, a shutter release lever, a spring connecting said release lever with said setting ring, and a resiliently supported setting lever for actuating said setting ring.

8. A focal plane shutter as claimed in claim 1, comprising a shutter release lever, and a "bulb" latch which cooperates with said lever, the latter automatically and resiliently forming a latch means for the drive of the following shutter curtain when the exposure slot is at its maximum setting.

9. A focal plane shutter as claimed in claim 1, comprising a "bulb" latch, a stop arranged on said latch and a projection arranged on the following curtain, said stop being disposed in the path of said projection when the latch is depressed.

10. A focal plane shutter as claimed in claim 1, comprising a setting-lever, a "bulb" latch and a projection on said latch cooperating with said lever during the setting operation.

11. A focal plane shutter as claimed in claim 1, comprising a setting lever, a "bulb" latch, a projection on said latch and a control cam on said lever, said cam coacting with said projection.

No references cited.